United States Patent
Beuschel et al.

(10) Patent No.: US 11,047,497 B2
(45) Date of Patent: Jun. 29, 2021

(54) PNEUMATIC VALVE

(71) Applicant: Conti Temic Microelectronic GmbH, Nuremberg (DE)

(72) Inventors: Michael Beuschel, Stammham (DE); Stefan Bauer, Engelbrechtsmünster (DE)

(73) Assignee: Conti Temic Microelectronic GmbH

( * ) Notice: Subject to any disclaimer, the term of this patent is extended or adjusted under 35 U.S.C. 154(b) by 141 days.

(21) Appl. No.: 16/463,437

(22) PCT Filed: Dec. 14, 2017

(86) PCT No.: PCT/EP2017/082774
§ 371 (c)(1),
(2) Date: May 23, 2019

(87) PCT Pub. No.: WO2018/114572
PCT Pub. Date: Jun. 28, 2018

(65) Prior Publication Data
US 2020/0378516 A1 Dec. 3, 2020

(30) Foreign Application Priority Data
Dec. 20, 2016 (DE) ...................... 10 2016 225 519.3

(51) Int. Cl.
*F16K 31/02* (2006.01)
*F03G 7/06* (2006.01)
*F16K 37/00* (2006.01)

(52) U.S. Cl.
CPC ............ *F16K 31/025* (2013.01); *F03G 7/065* (2013.01); *F16K 37/0041* (2013.01)

(58) Field of Classification Search
CPC ..... F03G 7/065; F16K 37/0041; F16K 31/025
See application file for complete search history.

(56) References Cited

U.S. PATENT DOCUMENTS 3,613,732 A * 10/1971 Willson ................. F03G 7/065
137/625.44
5,531,664 A 7/1996 Adachi et al.
(Continued)

FOREIGN PATENT DOCUMENTS

CN 103874872 A 6/2014
CN 105121928 A 12/2015
(Continued)

OTHER PUBLICATIONS

English Translation of the Written Opinion for International Application No. PCT/EP2017/082774, dated Feb. 20, 2018—6 pages.
(Continued)

*Primary Examiner* — Craig J Price
*Assistant Examiner* — Andrew J Rost
(74) *Attorney, Agent, or Firm* — RatnerPrestia

(57) ABSTRACT

A pneumatic valve including an air chamber with an air connection, and an actuator with a movable shut-off element and with an SMA element composed of a shape memory alloy. The SMA element is mechanically coupled to the movable shut-off element, wherein, for the activation of the actuator, electrical heating power is fed to the SMA element, after which the SMA element deforms and brings about a predefined movement of the shut-off element for opening or closing the air connection. The actuator includes a detection unit to detect the arrival at and departure from an end position of the shut-off element when the actuator is activated. The actuator includes a control device which is configured such that, when the actuator is activated, the control device detects the current cycle time between a departure from and the next arrival at the end position by the shut-off element.

17 Claims, 5 Drawing Sheets

(56) References Cited

U.S. PATENT DOCUMENTS

| | | |
|---|---|---|
| 8,851,443 B2 | 10/2014 | Foshansky |
| 9,945,490 B2 | 4/2018 | Dankbaar et al. |
| 10,086,720 B2 | 10/2018 | Dankbaar |
| 10,107,410 B2 | 10/2018 | Dankbaar et al. |
| 2007/0063540 A1 | 3/2007 | Browne et al. |
| 2016/0018016 A1 | 1/2016 | Dankbaar et al. |

FOREIGN PATENT DOCUMENTS

| | | |
|---|---|---|
| DE | 102005060217 A1 | 7/2006 |
| DE | 102015201534 B3 | 4/2016 |
| DE | 112013007682 T5 | 9/2016 |
| DE | 112013007683 T5 | 12/2016 |
| DE | 102016225519 A1 | 6/2018 |
| EP | 0037490 A1 | 10/1981 |
| EP | 0153535 A2 | 9/1985 |
| WO | 2005026539 A2 | 3/2005 |
| WO | 2005026592 A2 | 3/2005 |
| WO | 2014135909 A1 | 9/2014 |
| WO | 2015086094 A1 | 6/2015 |
| WO | 2015185132 A1 | 12/2015 |

OTHER PUBLICATIONS

Chinese Office Action for Chinese Application No. 201780074843.8, dated Jan. 17, 2020, with translation, 11 pages.

International Search Report and Written Opinion for International Application No. PCT/EP2017/082774, dated Feb. 20, 2018—9 pages.

German Examination Report for German Application No. 10 2016 225 519.3, dated Oct. 30, 2017—7 pages.

Third Party Observations for International Application No. PCT/EP2017/082774, dated Mar. 25, 2019, 3 pages.

\* cited by examiner

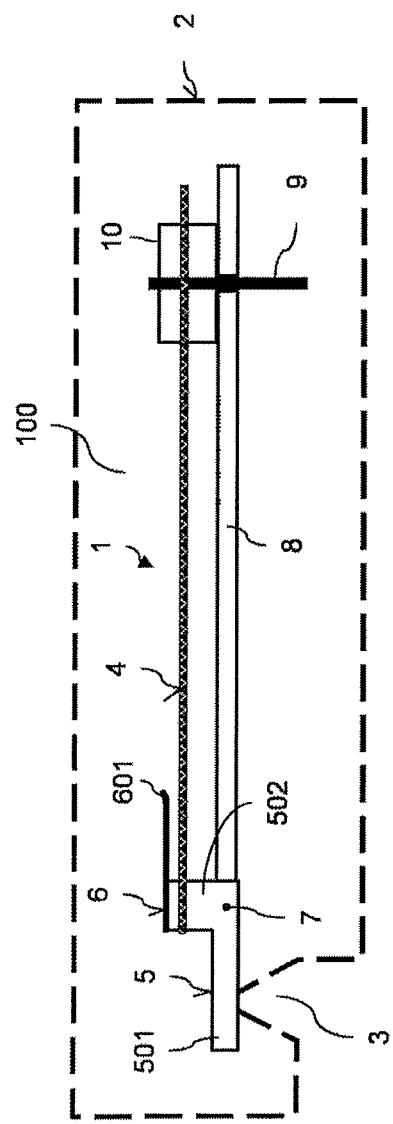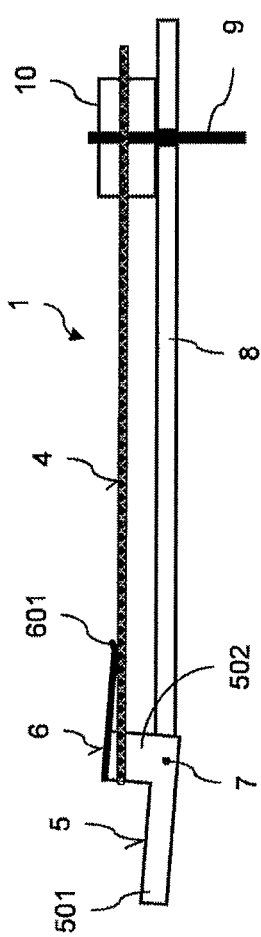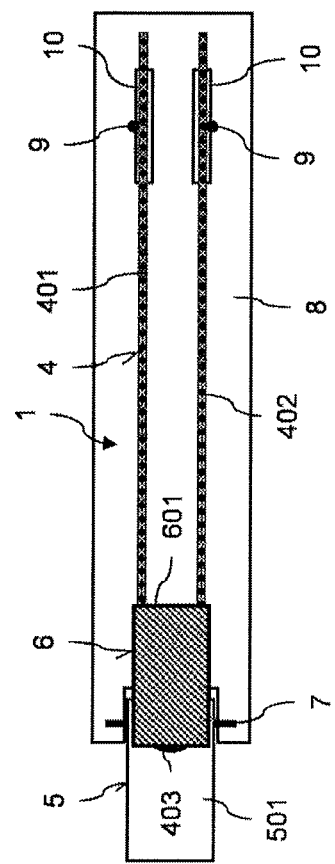
Fig. 1
Fig. 2
Fig. 3

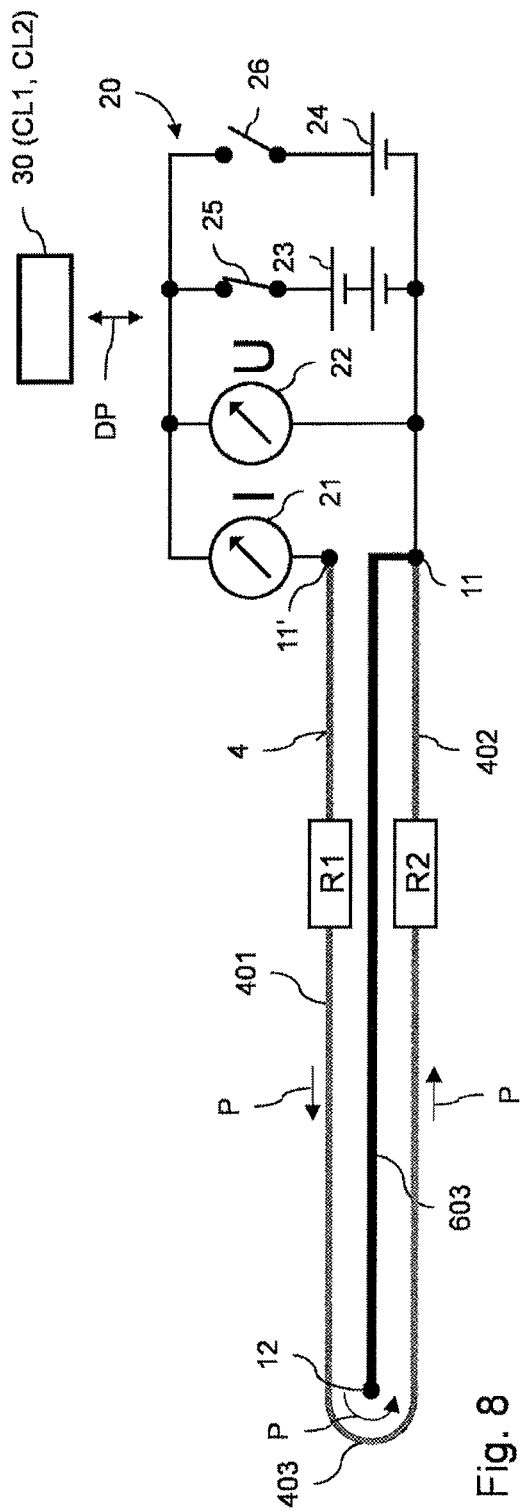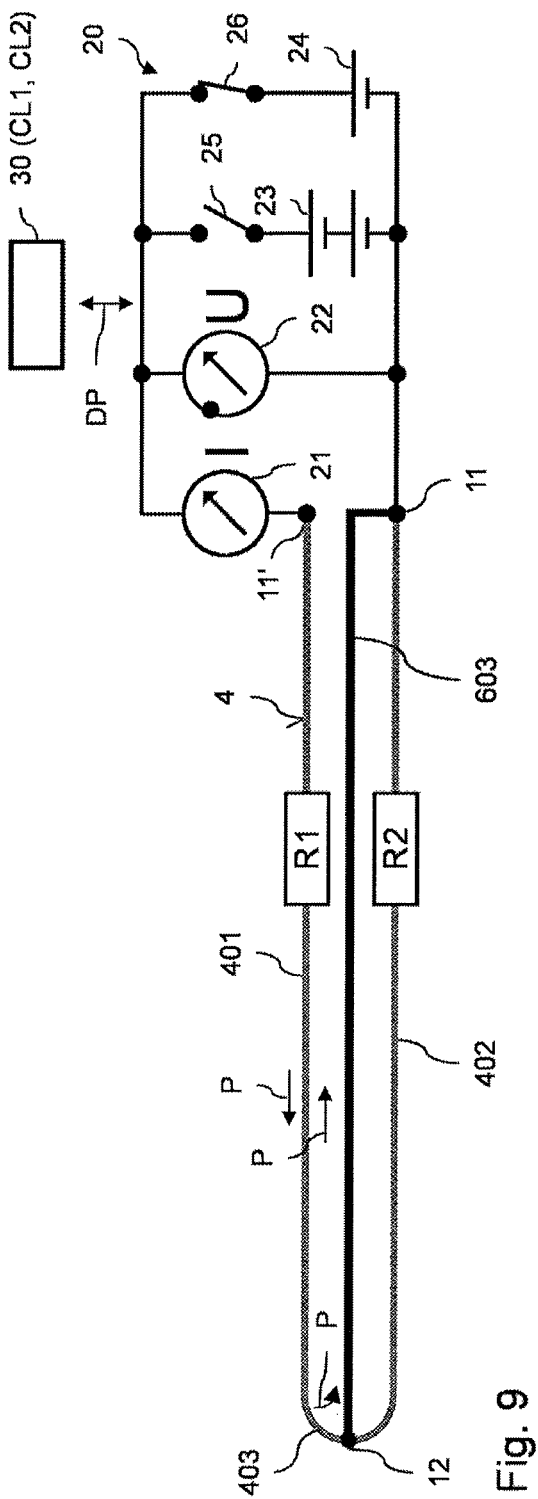
Fig. 8
Fig. 9

PNEUMATIC VALVE

CROSS REFERENCE TO RELATED APPLICATIONS

This application is the U.S. National Phase Application of PCT International Application No. PCT/EP2017/082774, filed Dec. 14, 2017, which claims priority to German Patent Application No. 10 2016 225 519.3, filed Dec. 20, 2016, the contents of such applications being incorporated by reference herein.

FIELD OF THE INVENTION

The invention relates to a pneumatic valve.

BACKGROUND OF THE INVENTION

Pneumatic valves are used for controlling air flows in a multiplicity of technical fields of application. Here, for the actuation of such valves, it is known to use so-called SMA actuators with SMA elements composed of a shape memory alloy, such as for example NiTi alloy (SMA=Shape Memory Alloy). The SMA elements are deformed by means of a flow of current and the resulting heating. After subsequent cooling, they can resume their original shape.

In order to achieve a long service life and a large number of activation cycles, the stroke and the effective force of the SMA actuator must be reliably limited. Accordingly, for an SMA actuator an end position is generally predefined which is reached when said SMA actuator is activated by feeding in current and which end position is not to be exceeded.

In order to detect the end position of an SMA actuator, in the prior art separate electrical contacts are used which indicate that the maximum stroke has been achieved. As a consequence, the heating power which is fed into the SMA actuator is generally reduced. Owing to the reduced heating power, the end position is departed from, at which time the heating power is reduced again so that the selected switched position of the valve is maintained. Therefore, when the SMA actuator is activated, a multiplicity of microcircuit processes occur, which bring about increased mechanical wear and disruptive switching noises.

Document DE 10 2005 060 217 A1, incorporated herein by reference, presents a valve with an SMA actuator whose end position is detected by means of a limit switch. As a result of the arrangement of the limit switch in the valve space to which pressure is applied, the moisture which occurs there can make the switch fail.

Document WO 2014/135909 A1, incorporated herein by reference, discloses a contact for detecting the end position of an SMA actuator in a pneumatic valve. The contact is arranged outside the valve chamber.

SUMMARY OF THE INVENTION

An aspect of the invention is a pneumatic valve with an SMA actuator, which valve reduces the mechanical load on the SMA actuator when it is activated.

The pneumatic valve according to an aspect of the invention comprises an air chamber with an air connection, and comprises an actuator with a movable shut-off element and with an SMA element (in particular a wire-shaped SMA element) composed of a shape memory alloy (e.g. an NiTi alloy). The SMA element is mechanically coupled to the movable shut-off element. For the activation of the actuator, electrical heating power is fed to the SMA element, after which the SMA element deforms in a manner known per se and as a result a predefined movement of the shut-off element to open or close the connection is brought about. The deformation of the SMA element is reversed when the supply of the electrical heating current is ended, as a result of which a reversal of the predefined movement of the SMA element is brought about.

The actuator of the valve according to an aspect of the invention comprises a detection unit in order to detect the arrival at and departure from an end position of the shut-off element when the actuator is activated. Moreover, a control device is provided in the actuator, wherein the detection device can be, if appropriate, a component of the control device. The control device is configured in such a way that, when the actuator is activated, said control device sets the electrical heating power to a first power value if according to the detection of the detection unit the shut-off element is not in the end position, and in that, when the actuator is activated, said control device sets the electrical heating power to a second power value if according to the detection of the detection unit the shut-off element is in the end position. The second power value is lower than the first power value here.

The control device of the actuator is also configured in such a way that, when the actuator is activated, said control device detects the current cycle time between the departure from and the next arrival at the end position by the shut-off element, or detects a measure of the current cycle time, and reduces the difference between the first and second power values if the current cycle time undershoots a first setpoint cycle time, and increases the difference between the first and second power values if the current cycle time exceeds a second setpoint cycle time. The second setpoint cycle time is longer than or equal to the first setpoint cycle time here. In one variant of an aspect of the invention, the second setpoint cycle time corresponds to the first setpoint cycle time.

The above term the measure of the current cycle time is to be understood as meaning that instead of the direct detection of the current cycle time it is also possible to detect a variable which correlates directly with the current cycle time, such as e.g. the corresponding frequency. In order to reduce or increase the difference between the first and second power values, the undershooting or exceeding of the first or second setpoint cycle time can then be detected on the basis of the exceeding or undershooting of corresponding setpoint frequencies.

The valve according to an aspect of the invention has the advantage that the switching frequencies of an SMA actuator are limited suitably by controlling the power supply to the SMA element, with the result that the frequency of the micro-switching processes when the actuator is activated, and as a result the wear thereof, are kept low. In addition, the switching noises of the actuator can be reduced.

In one particularly preferred embodiment, the first setpoint cycle time and/or the second setpoint cycle time is between 10 ms and 100 ms, in particular between 20 ms and 50 ms. Such cycle times correspond to switching frequencies which are felt to be less loud and therefore less disruptive owing to the human hearing curve.

Depending on the configuration of the valve according to an aspect of the invention, the reduction and the increasing of the difference between the first and the second power values can be brought about in different ways. In particular, this reduction or increase can be achieved by exclusively changing the first power value or by exclusively changing the second power value or by changing both the first and the second power values.

In a further variant of the valve according to an aspect of the invention, the reduction and the increasing of the difference between the first and second power value take place in a chronologically continuous fashion, i.e. when the first setpoint cycle time is undershot and when the second setpoint cycle time is exceeded, the difference is changed on the basis of a continuous function, such as e.g. a linear function, as a function of the time. Nevertheless, according to an aspect of the invention it is also possible to reduce or increase the difference between the first power value and the second power value in a chronologically discreet fashion, i.e. incrementally.

According to an aspect of the invention, the reduction or increasing of the difference of the power values can be brought about differently. In particular, this can be achieved by varying the voltage which is fed to the SMA element or by varying the current which is fed to the SMA element. In order to vary the voltage or the current it is possible to use e.g. pulse width modulation.

The pneumatic valve according to an aspect of the invention can comprise, in addition to the air connection described above and the associated actuator, if appropriate also a plurality of such air connections with associated actuators. Moreover, the pneumatic valve can also additionally contain non-controllable air connections without actuators or air connections based on other actuator principles. In addition, it is also possible for an actuator to activate a plurality of air connections simultaneously.

In one preferred variant of the valve according to an aspect of the invention, the actuator thereof is configured in such a way that, when the end position of the shut-off element is reached, the resistance of a section of the SMA element is electrically bypassed by means of a bypass section, wherein here and below the term resistance is always to be understood as meaning the electrical resistance. In other words, the specified section of the SMA element is essentially short-circuited by means of the bypass section. The term the section of the SMA element is to be understood in a broad fashion here and can comprise not only a partial section of the SMA element but, under certain circumstances, also the entire SMA element.

The electrical resistance of the SMA element is reduced by means of the electrical bypass just described. The detection unit is designed to detect this decrease of the electrical resistance of the SMA element by means of an electrical resistance measurement, and as a result to detect the arrival at the end position of the shut-off element. In addition, the detection device is designed to detect the ending of the decreasing of the resistance of the SMA element, as a result of which the departure from the end position of the shut-off element is detected. When the end position is reached, direct mechanical and electrical contact is preferably established between the bypass section and the SMA element at least one contact point.

The embodiment just described has the advantage that a change in resistance of the SMA element is easily generated by means of a bypass section in order to detect an end position of the actuator. It is therefore possible to dispense with the use of costly separate limit switches. Instead, interaction of the bypass section with the SMA element makes possible end position detection via the electrical supply connections of the SMA element. There is therefore no need for an additional electrical connection for the end position detection, as a result of which the additional expenditure on forming contact with it, and, under certain circumstances, on additional air-tight feeding through thereof are avoided.

In one particularly preferred variant of the embodiment just described, the actuator is configured in such a way that the deformation of the SMA element brings about a relative movement between the bypass section and the SMA element, wherein, when the end position of the shut-off element is reached, the relative movement brings about the electrical bypassing of the resistance of the section of the SMA element. In this way, the deformation of the SMA element is directly coupled to a relative movement between the bypass section and the SMA element. Depending on the configuration, the bypass section can change or even maintain its position during this relative movement.

In a further variant, the actuator comprises an electrically conductive element, preferably in the form of a plate (e.g. a leaf spring) or a web. The electrically conductive element is rigidly connected to the shut-off element or it forms a part of the shut-off element, wherein the bypass section is contained in the electrically conductive element. In this variant of an aspect of the invention, the bypass section moves together with the shut-off element.

In one particularly preferred embodiment, the shut-off element of the pneumatic valve is a valve flap which executes, as a predefined movement for opening or closing the air connection, a tilting action. This tilting action can be brought about e.g. by a rotation of the valve flap, i.e. the valve flap is attached via a hinge or a joint. Likewise, the tilting of the valve flap can be brought about by elastic bending, e.g. by the valve flap containing a leaf spring.

In a further preferred embodiment, the electrically conductive element, which is described above and is rigidly connected to the shut-off element or is part of the shut-off element, is arranged on one side of the valve flap which points away from the air connection.

In a further configuration of the valve according to an aspect of the invention, the SMA element is an SMA wire which is contracted by feeding in the electrical heating current and as a result brings about the predefined movement of the shut-off element. The SMA wire preferably runs in a plane. The use of an SMA wire as an SMA element makes possible a compact design of the valve according to an aspect of the invention.

In a further variant, the SMA wire just described comprises a first and a second wire section, between which a coupling section of the SMA wire is located, wherein the coupling section is coupled mechanically to the shut-off element. The electrically conductive element just described is preferably arranged in such a way that, when the end position is reached, the conductive element touches the first wire section and the second wire section, in each case at a contact point, and as a result brings about the electrical bypassing of the resistance of the section of the SMA element.

In one variant of the valve according to an aspect of the invention, the actuator comprises, in addition to or as an alternative to the electrically conductive element described above, an electrically conductive component which is preferably configured as an electrical line. The electrically conductive component has a fixed position in the valve, and the bypass section is contained in this component. In contrast to the above electrically conductive element, the electrically conductive component therefore does not carry out a movement together with the shut-off element.

In one preferred variant, the electrically conductive component is a line, one end of which is electrically connected to the SMA element and the other end of which comprises a contact point which, when the end position of the shut-off element is reached, comes into contact with the SMA element and as a result brings about the electrical bypassing of the resistance of the section of the SMA element. If the shut-off element is not in the end position, the contact point is exposed. With this variant, only a single contact point is required to bring about a reduction in resistance when the end position is reached.

In a further preferred configuration of the embodiment just described, at least part of the line which forms the electrically conductive component between the first and second wire section of the SMA wire explained above, extends in the direction of the coupling section of the wire. As a result, a compact design of the SMA actuator with low height is made possible.

In one configuration of the valve according to an aspect of the invention, the detection unit is configured in such a way that, for the measurement of electrical resistance, the heating current and the voltage giving rise to the heating current are recorded and the resistance of the SMA element is calculated therefrom.

The pneumatic valve according to an aspect of the invention is preferably provided for filling and/or emptying at least one elastic air bladder in a device for pneumatically adjusting a seat in a means of transportation. In other words, an aspect of the invention also comprises a device for pneumatically adjusting a seat in a means of transport, having at least one elastic air bladder and having a valve according to an aspect of the invention for filling and/or emptying the at least one air bladder.

BRIEF DESCRIPTION OF THE DRAWINGS

Exemplary embodiments of aspects of the invention will be described in detail below on the basis of the appended figures.

Of the said figures:

FIG. 1 and FIG. 2 show lateral views of a first embodiment of a valve according to an aspect of the invention in a closed position and in an opened position;

FIG. 3 shows a plan view of the valve from FIG. 1;

FIG. 8 and FIG. 9 show schematic illustrations which clarify the detection of the end position by means of a detection unit for a second embodiment of a valve according to an aspect of the invention.

DETAILED DESCRIPTION OF THE PREFERRED EMBODIMENTS

Figure 4:
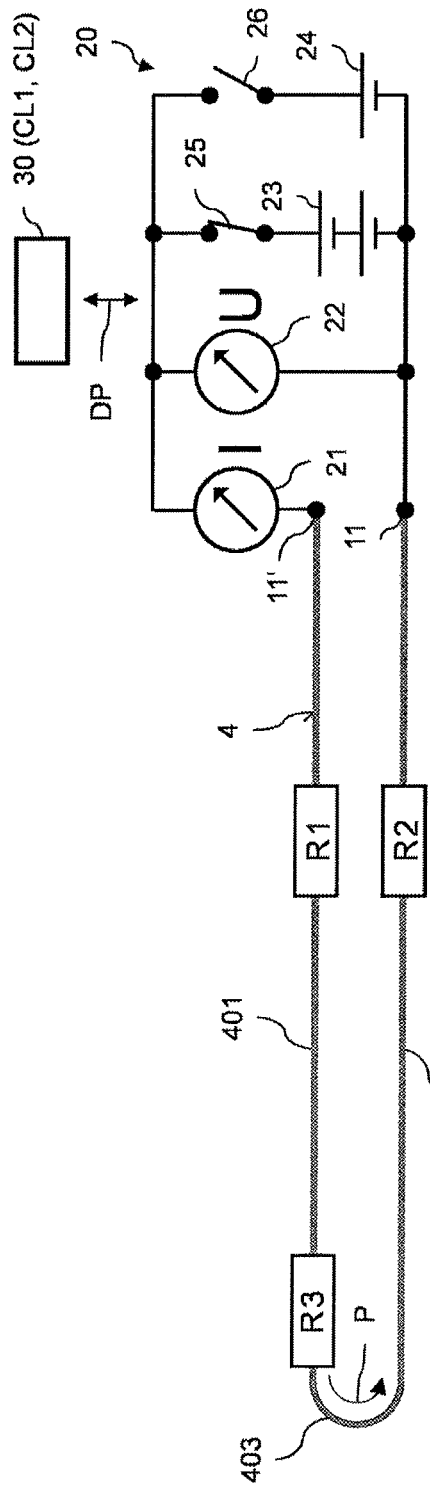
FIG. 4 and FIG. 5 show schematic illustrations which clarify the detection of the end position by means of a detection unit for the valve from FIG. 1 to FIG. 3.

FIG. 1 shows a sectional view through a first embodiment of a valve according to an aspect of the invention. The valve comprises an actuator 1 which is arranged in a valve housing 2. The valve housing is presented only schematically by a dashed outline. In addition, for reasons of clarity the housing has been omitted from FIG. 2 and FIG. 3. The valve housing comprises an air connection 3 which is opened and closed by means of the actuator 1, as explained in more detail below.

In the actuator position shown in FIG. 1, the air connection 3 is closed. Depending on the configuration of the valve, a plurality of air connections can be provided which are each opened or closed by a corresponding actuator 1. Moreover, if appropriate there is also the possibility of an actuator simultaneously opening or closing a plurality of air connections.

The actuator 1 is positioned in an air chamber 100 which is closed off in a pressure-tight fashion with respect to the surroundings of the valve by the housing 2. In this context, the actuation mechanism of the actuator is attached to a base plate 8, which is preferably an integral component of the housing 2. The actuator comprises an SMA wire 4, the two right-hand ends of which are each connected via crimp elements 10 to the housing 2 and to respective contact pins 9. This is also apparent, in particular, from the plan view of FIG. 3. The precise attachment of the SMA wire 4 via the crimp elements 10 is not essential for an aspect of the invention. Therefore, this attachment is only indicated schematically in FIG. 1 to FIG. 3. The SMA wire 4 is composed of a shape memory alloy which is known per se, such as e.g. an NiTi alloy.

The contact pins 9 are conducted via a pressure-tight feedthrough in the base plate 8 to a conductor plate (not shown) which comprises the detection unit described below and an actuation unit for the actuator. In one preferred variant, the base plate 8 separates the air chamber 100 from a lower region of the housing 2. In this lower region, the circuit board is then arranged, which has the advantage that said circuit board is protected against the airstream and against moisture in the air chamber.

A heating current, which is generated by a separate voltage source, is fed to the SMA wire 4 via the contact pins 9 in order to actuate the actuator 1. If the valve shown is used, for example, to fill or vent an elastic air bladder in a device for pneumatically adjusting a motor vehicle seat, the voltage for the heating current can originate e.g. from the on-board power system of the motor vehicle.

As is apparent, in particular, from FIG. 3, the SMA wire 4 comprises a first straight section 401, which extends from one of the crimp elements 10 to a valve flap 5 composed of plastic, and a second straight section 402, which runs parallel to the section 401 and extends from the valve flap 5 to the other crimp element 10. Located between the first straight section 401 and the second straight section 402 is the bent section 403 which runs around a cylindrical projection 502 which is formed on the valve flap 5. As well as this cylindrical projection 502, the valve flap 5 comprises a horizontally running valve plate 501, which in the position in FIG. 1 closes the air connection 3 in a seal-forming fashion. If appropriate, a separate seal-forming element can be provided here on the underside of the valve plate 501, in order to ensure that the air connection 3 is closed off in a well-sealed fashion.

The valve flap 5 is coupled to the base plate 8 via a hinge 7. Moreover, a metallic leaf spring 6 with an end 601 which is slightly bent upward is attached on the upper side of the cylindrical section 502. A large part of the area of the leaf spring is located above the two sections 401 and 402 of the SMA wire 4. In the position shown in FIG. 1, the leaf spring 6 is spaced apart from these sections 401 and 402.

Figure 6:
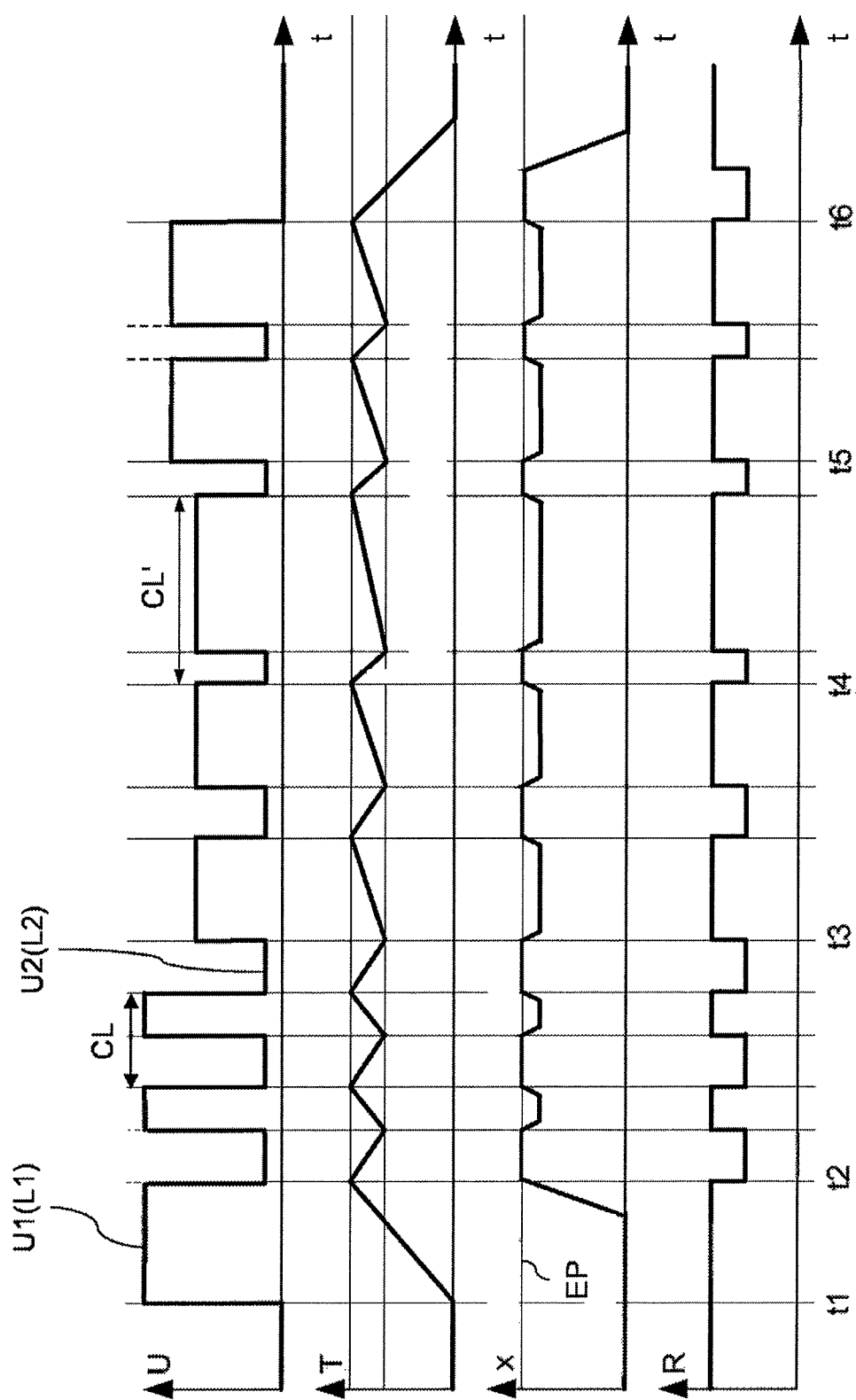
FIG. 6 is a diagram representing an embodiment of an actuator according to an aspect of the invention for reducing micro-switching processes.

In order to open the air connection 3, heating current or heating power is fed to the wire 4 via the contact pins 9, as a result of which the wire is heated and consequently contraction of the wire is brought about. The contraction results in the bent section 403 of the SMA wire 4 pulling the projection 502 to the right, as a result of which a tilting action of the valve flap 5 in the upward direction is brought about by means of the hinge 7, so that the air connection 3 is opened. The valve flap 5 is raised as far as a predefined end position, wherein this end position is indicated in FIG. 2. In FIG. 6, described below, this end position is clarified by the reference sign EP. In the end position, electrical contact is established between the two wire sections 401 and 402 via the edge 601 of the leaf spring 6. The edge 601 represents here a variant of a bypass section in the sense of the claims. By means of the edge 601, the contact points of the two straight sections 401 and 402, which are touched by this edge 601, are connected with low impedance, with the result that the edge 601 short-circuits the part of the SMA wire to the left thereof, thereby bypassing the resistance of this part.

As a result of the bypassing just described, there is a reduction in the resistance of the SMA wire 4, which is detected by means of a detection unit 20 which interacts with the control device 30, as explained below by means of FIG. 4 to FIG. 6.

FIG. 4 shows a schematic illustration of the closed position of the actuator according to FIG. 1. The detection unit 20 and the control device 30 (not shown in FIG. 1 to FIG. 3) are additionally represented here. The control device 30 interacts with the detection device 20, as indicated by the double arrow DP. A first setpoint cycle time CL1 and a second setpoint cycle time CL2 are stored in the control device. The method of functioning of the control device 30 will be described in more detail below.

The resistance of the SMA wire is measured with the detection unit 20. The detection unit is connected to the wire 4 via corresponding contact points 11 and 11'. The contact points correspond to the formation of contact with the wire by the contact pins 9 from FIG. 1. For the sake of clarification, in FIG. 4 and FIG. 5 the resistance of the wire from the contact point 11' as far as the contact point 12' of the edge 601 with the air connection opened is denoted by R1. Analogously, the resistance from the contact point 11 as far as the contact point of the edge 601 with the air connection opened is denoted by R2. In contrast, the resistance of the wire section lying to the left of the edge 601 is denoted by R3.

Figure 5:
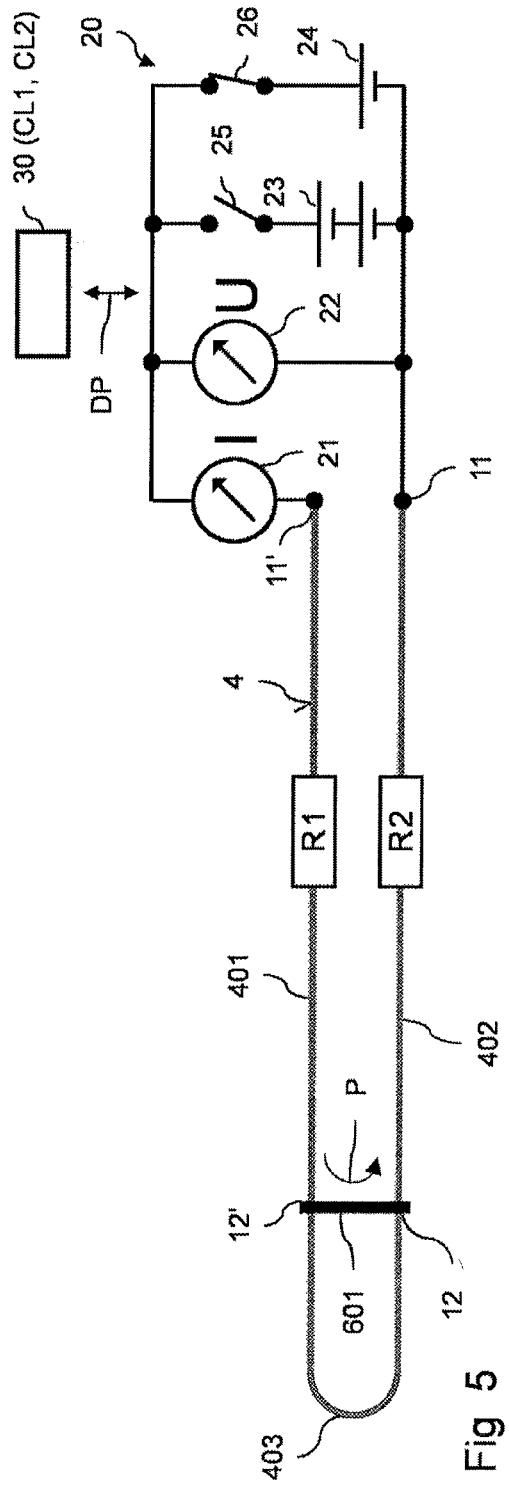

The detection unit 20 illustrated in FIG. 4 and FIG. 5 comprises an ammeter 21, which measures the current I through the SMA wire. In this context, the flow of current is indicated by corresponding arrows P in FIG. 4 and FIG. 5 as well as also in FIGS. 8 and 9 described below. In addition, a voltmeter 22 is provided for recording the applied voltage U.

The detection unit 20 also contains a switch 25 and a switch 26. A voltage source 23, which supplies the heating current for deforming the SMA wire 4, is also connected with the switch 25. In contrast, with the switch 26 a voltage source 24 is connected to a lower voltage than that of the voltage source 23.

The voltage U1 of the voltage source 23 and the voltage U2 of the voltage source 24 can be varied by means of the control device 30, wherein the voltages U1 and U2 are represented in FIG. 6. It is also indicated there that when the voltage U1 is applied a first electrical power value L1 is fed to the SMA wire, and when the voltage U2 is applied a second power value L2 is fed.

Without activation of the actuator, both switches 25 and 26 are opened, with the result that the switch position shown in FIG. 1 is assumed. According to FIG. 4, the switch 25 is now closed in order as a result to feed heating current or heating power to the SMA wire 4, with the result that the latter contracts and causes the valve flap 5 to rise. At the same time, the voltage U and heating current I are recorded by means of the volt meter 22 and the ammeter 21. For these reasons, the resistance of the SMA wire is determined, said resistance having the value R=R1+R2+R3 in the scenario in FIG. 4. The resistance of the SMA wire is recorded essentially continuously here, i.e. at very short time intervals, by means of the measurement of the current and of the voltage. Accordingly, the corresponding change in resistance of the wire, caused by the short-circuit by means of the bypass section, can be detected very quickly and reacted to.

Finally, owing to the contraction of the wire, the end position shown in FIG. 2 is reached. This end position is also illustrated in FIG. 5. As is apparent, the edge 601 now short-circuits the two wire sections 401 and 402 at corresponding contact points 12 and 12', with the result that the resistance R3 of the part of the SMA wire lying to the left of the edge 601 in FIG. 5 is bypassed. As a result, the resistance of the SMA wire is reduced by the absolute value R3, i.e. it is then only a case of R=R1+R2. This is recorded using the detection unit 20 by means of the ammeter 21 and the voltmeter 22.

The switches 25 and 26 are still in the switched position shown in FIG. 4 when this reduction in resistance is recorded. If the reduction in resistance is then recorded by the detection unit 20, the control device 30 triggers activation of the switches 25 and 26, after which the switches 25 and 26 assume the switched position shown in FIG. 5. In other words, the switch 25 is opened and the switch 26 is closed. Accordingly, the SMA wire 4 is connected to the voltage source 24, which supplies a significantly lower voltage U2 in comparison with the voltage U1 of the voltage source 23. Typically, the voltage of the voltage source 24 is approximately 10% to 50% of the voltage of the voltage source 23.

The reduction in the voltage fed to the SMA wire is necessary in order to avoid mechanical and thermal damage of the wire by excessively high current. A lower selection of the voltage of the voltage source 24 is to be made the larger the part of the wire which is short-circuited via the edge 601 is, since an excessively large short-circuited part brings about a higher current through the SMA wire.

The application of the relatively low voltage U2 once more causes the SMA wire to be extended, with the result that the end position of this wire is departed from. This is in turn recorded by means of the detection unit 20, after which the control device 30 activates the switches 25 and 26 again, with the result that the switched position shown in FIG. 4, in which the relatively high voltage U1 is fed again, is assumed. As a result, the SMA wire is contracted again until its end position is reached, after which the switched position in FIG. 5, for feeding the relatively low voltage U2, is changed to again.

The processes just described are repeated cyclically as long as the actuator is activated. In this context, the voltages U1 and U2 are conventionally selected with fixed values, with the result that micro-switching processes are triggered with a high frequency during the activation of the actuator. These micro-switching processes bring about mechanical loading of the contact points and disruptive switching noises of the SMA actuator. In order to keep the number of micro-switching processes low, in the embodiment described here the magnitude of the voltage U1 of the voltage source 23 is influenced by means of the control device 30, as is described below with reference to FIG. 6.

The diagram in FIG. 6 comprises four partial diagrams, wherein the time t is represented along the abscissa of each partial diagram. The top partial diagram represents the voltage U which is applied to the SMA wire 4 and is recorded by means of the voltmeter 22 in FIG. 4 and FIG. 5. The second partial diagram from the top shows the temperature T of the SMA wire. The third partial diagram from the top represents the stroke x of the shut-off element 5, wherein the end position of the shut-off element is indicated by the vertical line EP. In the bottom partial diagram in FIG. 6, the resistance R is shown, which is recorded by means of the detection unit 20 in FIG. 4 and FIG. 5. In this context, the arrival at or the departure from the end position EP is detected by means of the change in the resistance.

In the scenario in FIG. 6, a switching signal for actuating the actuator in the control device 30 is received at the time t1, in order to open the air connection 3 from FIG. 1. As a consequence, the switches 25 and 26 are switched, by means of the control device 30, into the switched position shown in FIG. 4. The voltage U1 of the voltage source 23 and the corresponding first power value L1 are set to a high value here. Between the times t1 and t2, heating of the SMA wire 4 occurs, with the result that the latter contracts until finally the end position EP is reached at the time t2. At this time, the wire sections 401 and 402 are connected with low impedance via the edge 601 of the leaf spring 6, which brings about a reduction in the resistance R and as a result causes the end position EP to be detected. As a consequence, the control device 30 switches the switches 25 and 26 into the switched position shown in FIG. 5, with the result that the voltage U2 is fed in with a low voltage value and a correspondingly low power value L2.

As long as the actuator is in the activated state, the switching between the two voltages U1 and U2 is repeated. In this context, the voltage U1 is applied if the shut-off element is not in the end position EP, and the voltage U2 is applied if the shut-off element is in the end position EP. Owing to the large voltage difference between U1 and U2, this repetition occurs with a high switching frequency or a short cycle time, indicated by CL in FIG. 6. Conventionally, the voltages U1 and U2 are not changed here, with the result that frequent micro-switching processes occur with correspondingly high mechanical loading and disruptive switching noises.

In order to reduce the frequency of the micro-switching processes, the control device 30 has recourse to the setpoint cycle times CL1 and CL2 already mentioned above. The first setpoint cycle time CL1 represents here a minimum cycle time and accordingly a maximum frequency of the micro-switching processes. In other words, the switching frequency of the micro-switching processes is limited over the first setpoint cycle time, and therefore the number of micro-switching processes is reduced. The second setpoint cycle time CL2 represents a maximum cycle time, and in this sense a minimum switching frequency. The switching frequency should not be undershot, in order, as a result, to ensure a sufficiently fast reaction time of the SMA actuator to changing conditions, such as e.g. changed cooling of the SMA wire by an airflow.

According to an aspect of the invention, when the actuator is activated the current cycle time of successive micro-switching processes is recorded by means of the control device 30. In the scenario in FIG. 6, in this context it is detected, in the time period between t2 and t3, that the current cycle time CL undershoots the first setpoint cycle time CL1, which gives rise to disruptive switching noises and high mechanical loading. Owing to this undershooting, the control device 30 reduces the difference between the voltages U1 and U2 at the time t3. In the embodiment described here, in this context the value of the voltage U1 of the voltage source 23 is lowered, whereas the voltage U2 of the voltage source 24 is not changed. As a consequence, the cycle time decreases significantly, as a result of which the micro-switching processes are executed less frequently.

At the time t4, the cooling behavior of the SMA wire, i.e. the temperature of the wire, decreases more quickly than before as a result of external influences. This gives rise to an increase in the cycle time to the value CL', which is recorded by the control device 30. The value of the cycle time CL' is of such a magnitude here that it exceeds the second setpoint cycle time CL2. As a consequence, at the time t5 the control device 30 increases the difference between the voltages U1 and U2 by raising the voltage U1 again. This then gives rise to a cycle time which is between the first setpoint cycle time CL1 and the second setpoint cycle time CL2.

At the time t6, the actuation of the actuator is ended on the basis of a corresponding signal. As a result, both switches 25 and 26 are opened by means of the control device 30, which brings about cooling and expansion of the wire, and lowering of the valve flap 5. It is to be noted here that the valve flap 5 is prestressed toward its closed switched position using elastic means (not shown), with the result that a restoring force for moving the valve flap into the closed position is ensured.

With the actuation method in FIG. 6 as just described, the frequency of micro-switching processes can be reduced by corresponding setpoint cycle times and adaptation based thereon of the voltage which is fed to the actuator, as a result of which the mechanical wear of the actuator can be decreased and disruptive switching noises reduced. Through suitable selection of the setpoint cycle times, a sufficiently fast reaction time of the actuator can also be ensured here. Typical values for a first or second setpoint cycle time lie between 20 ms and 50 ms. Instead of the above actuation on the basis of cycle times, in one variant of the actuation method the switching frequencies can also be recorded and used for the purpose of control.

In the embodiment in FIG. 4 and FIG. 5 as well as analogously also in the embodiment according to FIG. 8 and FIG. 9 as described below, two voltage sources are used to make available the voltages U1 and U2. However, it is alternatively also possible that, instead of two voltage sources, merely a single voltage source with a controllable voltage supply is used to set the voltage values for U1 and, if appropriate, also for U2. PWM (pulse width modulation) can be used in a manner known per se to regulate the voltage. In this context, the switch-on periods in the PWM intervals are suitably varied. In this context, the measurement of the resistance must always be carried out within the switch-on period of a respective PWM interval, since without energization it is not possible to measure the resistance.

Figure 7:
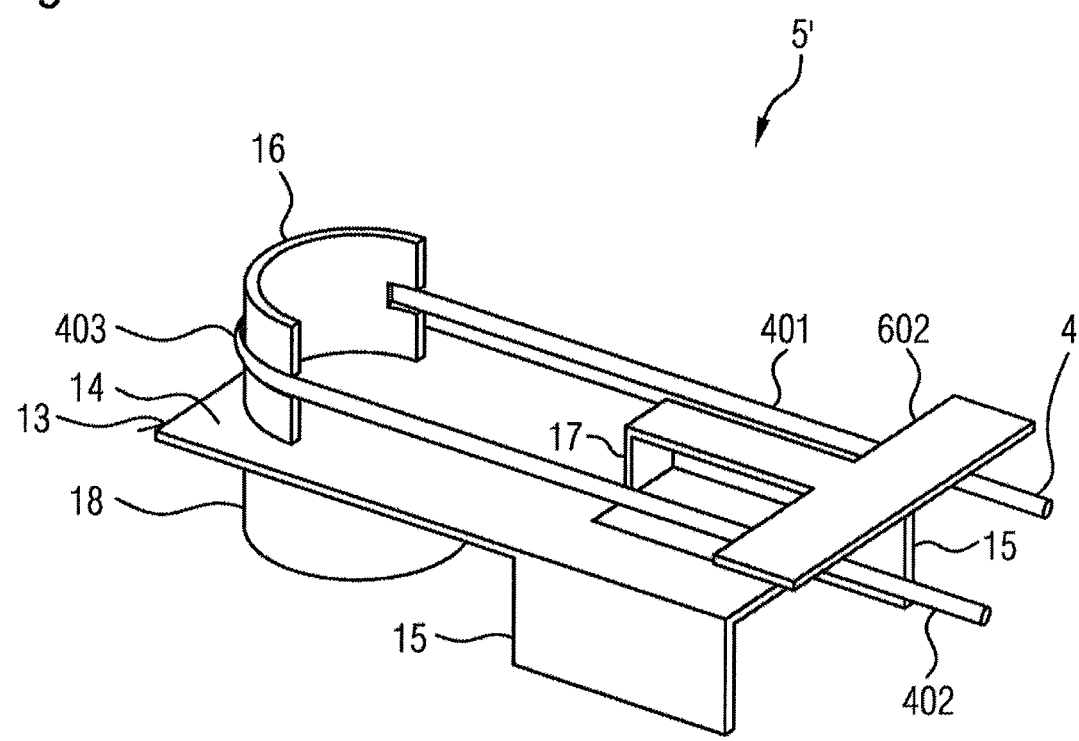
FIG. 7 is a perspective illustration of a modified variant of a valve flap used in the valve according to an aspect of the invention.

FIG. 7 shows a perspective illustration of a modified variant of the valve flap shown in FIG. 1 to FIG. 3. In contrast to the flap in FIG. 1 to FIG. 3, the valve flap 5' of FIG. 7 is composed essentially of a leaf spring 13 and a sealing element or sealing path 18. The leaf spring comprises a horizontally running spring leaf 14, on the underside of which the sealing element 18 which is composed of soft plastic is mounted. In the closed state of the valve flap 5', this sealing element 18 rests on the valve seat of the air connection 3. The leaf spring 13 comprises, in addition to the spring leaf 14, vertically downwardly running lugs 15, by means of which the leaf spring is secured to the base plate 8, e.g. by inserting the lugs into cutouts in the base plate.

In addition, a semicircular section 16 and a bent section 17 are formed on the leaf spring 13. The bent section 17 opens into a web or wing 602, which represents an embodiment of an electrically conductive bypass section in the sense of the claims. The web runs transversely with respect to the SMA wire 4, as is clearly apparent from FIG. 6. The wire 4 is guided around the semicircular section 16 of the leaf spring 13. The SMA wire is connected, in a way analogous to FIG. 1 to FIG. 3, to contact pins and to a corresponding circuit board, which is not apparent from FIG. 7. The lug 15, the semicircular section 16, the bent section 17 and the web 602 are integral components of the leaf spring 13. They are formed by punching and bending a corresponding metal plate.

In order to activate the valve plate 5', the SMA wire 4 is in turn energized with a heating current, which causes it to contract. As a consequence, the spring leaf 14 is elastically deformed by the force effect on the semicircular section 16 with the result that it rises, and as a result the sealing element 18 is removed from the air connection 3. The tilting action of the valve flap 5' therefore occurs by means of elastic deformation of the spring leaf 14 and not by means of rotation on a hinge, as is the case in the embodiments in FIG. 1 to FIG. 3. This has the advantage that the flexibility of the leaf spring results in a peeling pulling off movement of the sealing element 18 from the valve seat. This reduces the force necessary to open the air connection if the sealing element sticks to the valve seat.

FIG. 8 and FIG. 9 show schematic illustrations of a further embodiment of an actuator in the valve according to an aspect of the invention. The detection unit 20 and the control device 30 in FIG. 8 and FIG. 9 are of analogous design to those in FIG. 4 and FIG. 5. The detection unit 20 serves in turn to record the resistance of the SMA wire 4 by means of the ammeter 21 and the voltmeter 22. Likewise, the control device 30 carries out the actuation shown in FIG. 6, in order to reduce the frequency of micro-switching processes.

In the embodiment in FIG. 8 and FIG. 9, the same valve flap as in FIG. 1 to FIG. 3 can be used as the valve flap, but without the leaf spring 6. In the embodiment in FIG. 8 and FIG. 9, the resistance R1 denotes the resistance of the wire section 401 plus half the adjoining, bent wire section 403. Analogously, the resistance R2 denotes the resistance of the wire section 402 plus half the adjoining, bent wire section 403.

The short-circuiting of a section of the SMA wire 4 occurs in FIG. 8 and FIG. 9 via an electrical line 603. The electrical line extends from a contact point 11 at the right-hand end of the wire section 402 to the bent section 403 of the SMA wire 4. A large part of the electrical line 603 runs parallel to the two wire sections 401 and 402 here. In the switched position shown in FIG. 8, in which the valve flap is closed, electrical contact is not made with a front contact point 12 of the line 603. The end of the line with the contact point 12 can be guided e.g. in a horizontally running drilled hole in the projection 502 of the valve flap 5 from FIG. 1 to FIG. 3. The drilled hole is located in the plane of the SMA wire 4.

Contraction of the SMA wire 4 is in turn brought about by the feeding in of heating current via the closing of the switch 25. This results in a tilting action of the valve flap 5, after which the bent section 403 moves to the contact point 12. When the end position is reached, the deflection point of the SMA wire in the region of the bent section 403 then makes contact with the contact point 12 of the line 603, as is apparent from FIG. 9. In this way, electrical contact is established between the contact points 11 and 12, with the result that the resistance R2 of the wire section 402 is bypassed.

In the embodiment in FIG. 8 and FIG. 9, only a single contact point 12 is necessary to short-circuit a section of the SMA wire. In contrast to this, in the embodiments in FIG. 1 to FIG. 5 and FIG. 7 contact was made with two contact points of the SMA wire. In addition, in the embodiment in FIG. 8 and FIG. 9, the bypass section in the form of the line 603 is fixed, whereas the bypass section in the embodiments in FIG. 1 to FIG. 5 and FIG. 7 moves together with the valve flap.

In addition to the variants of aspects of the invention just described, other configurations are also possible. For example, in one embodiment in FIG. 8 and FIG. 9, instead of the valve flap 5 it is also possible to use the valve flap 5' with a leaf spring (shown in FIG. 7), wherein in this case the bent section 17 and the web 602 are omitted.

Alternatively, for example in the case of the valve flap 5' (shown, for example, in FIG. 7), the web 602 can extend only on one side as far as the wire section 401 or 402, with the result that in the opened state of the valve flap the SMA wire 4 is electrically short-circuited between the wire section 403 resting on the semicircular section 16 and the wire section 401 or 402 resting on the one-sided web 602.

Moreover, the SMA wire can also be laid in other geometries than in the preceding embodiments. For example, the SMA wire can also run in a V shape. Likewise, a wire and the like which is wound to form a helical spring can be used as an SMA actuator.

In the embodiment described above, it is assumed that the SMA wire does not have any coating, with the result that direct electrical contact is generated by touching it. If a non-conductive layer (e.g. an oxide layer) is present on the SMA wire, the oxide layer is removed at the locations at which the wire is touched by the bypass section. The SMA wire can optionally be coated in the region of the formation of contact by the bypass section with a conductive material which is preferably oxidation-protected. Likewise, by implementing a slight grinding movement during the formation of contact with the SMA wire by means of the bypass section it is possible to improve the robustness of the formation of contact.

The above actuation according to FIG. 6 has always been described with reference to an SMA actuator, the end position of which is detected using a resistance measurement. However, an aspect of the invention is not limited to detection of an end position by means of a resistance measurement. Instead, the arrival at or departure from the end position can also be detected in another way, e.g. by means of separate contact switches.

The above-described embodiments of aspects of the invention have numerous advantages. In particular, the mechanical loading of an SMA actuator during its activation can be decreased by reducing the frequency of the micro-switching processes. Through suitable definition of setpoint cycle times it is also possible to define the switching frequency of the micro-movements in such a way that, owing to the human hearing curve, the switching processes appear less loud and therefore are experienced as less disruptive.

In one preferred variant of an aspect of the invention, the end position of an SMA actuator is also easily brought about by means of a bypass section and the associated change in resistance of the SMA wire. Therefore, additional separate limit switches do not have to be provided for detecting this end position, and also no additional electrical connections have to be provided, which switches and connections increase the costs. Instead, with one simple component, such as e.g. with an electrically conductive plate, an electrically conductive web or electrical line, it is possible to short-circuit part of the wire and in this way detect the end position by recording the resulting change in resistance of the wire.

In the text above, aspects of the invention have been explained on the basis of a pneumatic valve. Nevertheless, aspects of the invention can, if appropriate, also be generally implemented as a fluid valve. In this case, the air chamber described above constitutes a fluid chamber, and the air connection described above is a fluid connection. Instead of air, a liquid and, in particular, a hydraulic oil, can also be used as the fluid. In other words, the valve according to an aspect of the invention can therefore be not only a pneumatic valve but, if appropriate, also a hydraulic valve.

LIST OF REFERENCE SIGNS

1 Actuator
100 Air chamber
2 Valve housing
3 Air connection
4 SMA wire
401, 402 Straight wire sections of the SMA wire
403 Bent wire section of the SMA wire
5, 5' Valve flap
501 Valve plate
502 Projection
6 Leaf spring
601 Bent edge of the leaf spring
602 Web
603 Line
7 Hinge
8 Base plate
9 Contact pin
10 Crimp element
R1, R2, R3 Resistances
P Arrows
11, 11', 12, 12' Contact points
13 Leaf spring
14 Spring leaf
15 Lugs
16 Semicircular section
17 Bent section
18 Sealing element
20 Detection unit
21 Ammeter
22 Voltmeter
23, 24 Voltage source
25, 26 Switch
30 Control device
DP Double arrow
I Current
U Voltage
U1, U2 Voltage values
L1, L2 Power values
EP End position
t Time
T Temperature
x Stroke
R Resistance
t1, t2, . . . , t6 Times

The invention claimed is:

1. A pneumatic valve comprising an air chamber with an air connection, and comprising an actuator with a movable shut-off element and an SMA element composed of a shape memory alloy, which SMA element is mechanically coupled to the movable shut-off element, wherein, for activation of the actuator, electrical heating power can be fed to the SMA element, after which the SMA element deforms and as a result brings about a predefined movement of the shut-off element for adjusting the shut-off element during micro-switching processes between opening or closing the air connection, wherein, when the supply of electrical heating power is ended, the deformation of the SMA element is reversed and as a result brings about a reversal of the predefined movement of the SMA element, wherein the actuator comprises a detection unit to detect the arrival at and departure from an end position of the shut-off element when the actuator is activated, wherein the actuator contains a control device which is configured in such a way that, when the actuator is activated, said control device sets the electrical heating power to a first power value if according to the detection of the detection unit the shut-off element is not in an end position and a stroke of the shut-off element is greater than zero, and, when the actuator is activated, said control device sets the electrical heating power to a second power value which is lower than the first power value if according to the detection of the detection unit the shut-off element is in the end position, and wherein the control device is also configured in such a way that, when the actuator is activated, said control device detects a current cycle time between the departure from and a next arrival at the end position by the shut-off element, or detects a measure of the current cycle time, and reduces a difference between the first and second power values if the current cycle time undershoots a first setpoint cycle time, and increases the difference between the first and second power values if the current cycle time exceeds a second setpoint cycle time which is longer than or equal to the first setpoint cycle time.

2. The pneumatic valve as claimed in claim 1, wherein the first setpoint cycle time and/or the second setpoint cycle time is between 10 ms and 100 ms.

3. The pneumatic valve as claimed in claim 2, wherein the reduction and the increasing of the difference between the first and second power values are brought about by exclusively changing the first power value or by exclusively changing the second power value or by changing both the first and the second power values.

4. The pneumatic valve as claimed in claim 1, wherein the reduction and the increasing of the difference between the first and second power values are brought about by exclusively changing the first power value or by exclusively changing the second power value or by changing both the first and the second power values.

5. The pneumatic valve as claimed in claim 1, wherein the reduction and the increasing of the difference between the first and second power value take place in a chronologically continuous or chronologically discreet fashion.

6. The pneumatic valve as claimed in claim 1, wherein the actuator is configured in such a way that, when the end position of the shut-off element is reached, the resistance of a section of the SMA element is electrically bypassed by means of a bypass section, and as a result the resistance of the SMA element is decreased, wherein the detection unit is designed to detect the decreasing of the resistance of the SMA element by means of a resistance measurement, as a result of which the arrival at the end position of the shut-off element is detected, and to detect the ending of the decreasing of the resistance of the SMA element as a result of which the departure from the end position of the shut-off element is detected.

7. The pneumatic valve as claimed in claim 6, characterized in that the actuator is configured in such a way that the deformation of the SMA element brings about a relative movement between the bypass section and the SMA element, wherein, when the end position of the shut-off element is reached, the relative movement brings about the electrical bypassing of the resistance of the section of the SMA element.

8. The pneumatic valve as claimed in claim 6, wherein the actuator comprises an electrically conductive element, in the form of a plate or a web, wherein the electrically conductive element is rigidly connected to the shut-off element or forms a part of the shut-off element, and wherein the bypass section is contained in the electrically conductive element.

9. The pneumatic valve as claimed in claim 1, wherein the shut-off element is a valve flap which executes, as a predefined movement for opening or closing the air connection, a tilting action, wherein the tilting action is brought about by elastic bending and/or by rotation of the valve flap.

10. The pneumatic valve as claimed in claim 1, wherein the SMA element is an SMA wire which is contracted by feeding in the electrical heating current, and as a result brings about the predefined movement of the shut-off element, wherein the SMA wire runs in a plane.

11. The pneumatic valve as claimed in claim 10, wherein the SMA wire comprises a first and a second wire section, between which a coupling section of the SMA wire is located, wherein the coupling section is coupled mechanically to the shut-off element.

12. The pneumatic valve as claimed in claim 11, wherein the actuator comprises an electrically conductive element in the form of a plate or a web, wherein the electrically conductive element is rigidly connected to the shut-off element or forms a part of the shut-off element, and wherein a bypass section is contained in the electrically conductive element and wherein the electrically conductive element is arranged in such a way that, when the end position of the shut-off element is reached, the conductive element touches the first wire section and the second wire section, in each case at a contact point, and as a result brings about the electrical bypassing of the resistance of the section of the SMA element.

13. The pneumatic valve as claimed in claim 11, wherein the actuator comprises an electrically conductive component, in the form of a line, wherein the electrically conductive component has a fixed position in the valve, and wherein a bypass section is contained in the electrically conductive component.

14. The pneumatic valve as claimed in claim 13, wherein the electrically conductive component is a line, one end of which is electrically connected to the SMA element and the other end of which comprises a contact point which, when the end position of the shut-off element is reached, comes into contact with the SMA element and as a result brings about the electrical bypassing of the resistance of the section of the SMA element.

15. The pneumatic valve as claimed in claim 14 wherein the SMA wire comprises a first and a second wire section, between which a coupling section of the SMA wire is located, wherein the coupling section is coupled mechanically to the shut-off element, and wherein at least part of the line between the first and second wire section extends in the direction of the coupling section of the SMA wire.

16. The pneumatic valve as claimed in claim 1, wherein the valve is provided for filling and/or emptying at least one elastic air bladder in a device for pneumatically adjusting a seat in a means of transportation.

17. The pneumatic valve as claimed in claim 1, wherein the first setpoint cycle time and/or the second setpoint cycle time is between 20 ms and 50 ms.

* * * * *